Aug. 2, 1927.
H. E. WEST
1,637,842
AUTOMOBILE VISOR
Filed Nov. 3, 1924
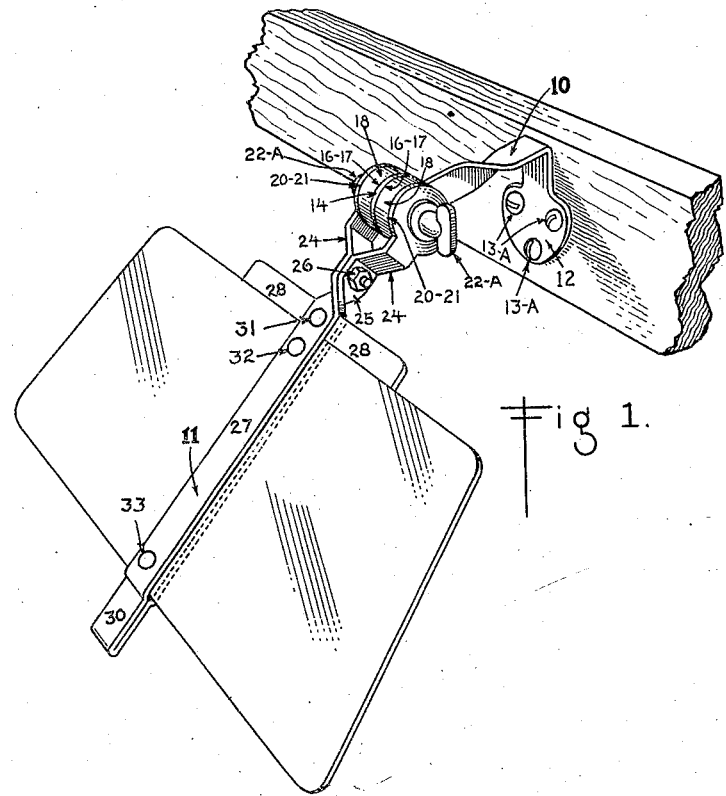
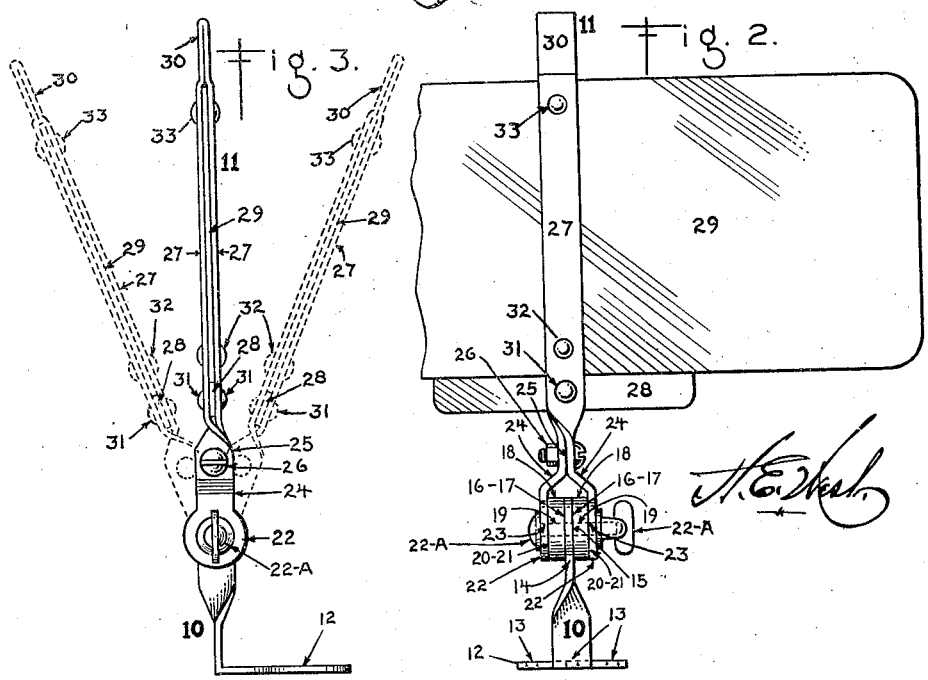

Patented Aug. 2, 1927.

1,637,842

UNITED STATES PATENT OFFICE.

HARRY E. WEST, OF DECATUR, ILLINOIS.

AUTOMOBILE VISOR.

Application filed November 3, 1924. Serial No. 747,532.

It is a well known objection to night driving, especially when meeting oncoming vehicles having glaring headlights, that the driver facing the glaring headlights, is seriously menanced by the blinding effect thereof, and the consequent loss of direction and control, often to the extent of serious and fatal injury by accident.

To overcome these objections by shielding the eyes of the driver, thus enabling him to maintain an accurate sense of direction and full control of the vehicle, my invention intends to provide a simple, efficient and durable arrangement whereby an automobile visor may be made, installed and operated with the least mechanical complexities, and possessing features enabling it to be instantly and conveniently adjusted to the driver's need.

My invention relates to automobile visors embodying a simple one-piece attaching device which may be stamped out of sheet metal of a suitable gauge, for economy in manufacture, having at one extremity thereof and integral therewith a substantially round shaped flat disc or head adapted to rotatably engage on its opposite faces opposite friction washers or rings which may be made of rubber or other suitable material to produce friction when in the act of rotating, said opposite friction washers or rings adapted to engage rotatably on their opposite outer faces, corresponding oppositely disposed flat discs or heads rotating on a single pivotal point, and adjusted as to tightness by means of a thumb nut and bolt, said corresponding oppositely disposed flat discs or heads being integral with the oppositely disposed extremities of a one-piece visor holding device, which may be stamped out of sheet metal of a suitable gauge, for economy in manufacture, and so shaped and bent as to form a pair of flat arms parallelly extending from said pivotal point, engaging by means of rivets therethrough the opposite faces and central portions of an advertising label, and the visor which may be made of transparent celluloid or other suitable material of a suitable color to meet the glare from the light rays of approaching vehicles; said flat arms being integral at their lower extremities or at the point of bending which produces the relatively parallel position of the same, thereby forming a handle to facilitate the instant adjusting of said visor.

A particular object of the invention is to provide a device of this type having a friction joint so constructed and of such material as to permit the visor to be instantly adjustable and at the same time to maintain the same securely in any position to which the driver's hand may adjust it, without the necessity and the consequent inconvenience of handling screws, nuts or bolts.

A further purpose of the invention is to provide a device of this type which may possess a simply and economically applied advertising device which will not in any way interfere with the clear vision of the driver through the visor, and which may be made of white celluloid or other suitable opaque material, adapted to have an advertisement printed or otherwise suitably applied thereon, and adapted to be securely fastened between said parallel arms, adjacent to the upper edge of said visor so that it will not come into contact with the hand of the driver, nor become soiled or broken in the act of manipulating said visor.

With these and other objects in view, the invention consists in the construction and novel combination and arrangement herein fully described, and illustrated in the accompanying drawings, it being understood that various changes in form, proportions and minor details of construction may be made within the scope of the appended claims.

In the accompanying drawings illustrating the invention.

Fig. 1, is a perspective view of the device illustrating the parallel flat arms formed of one piece of sheet metal and terminating in a yoke at the pivotal point.

Fig. 2, is a top plan view of the deivce, a portion of the visor being broken away to conserve space in the drawing, and showing particularly the construction of the friction joint.

Fig. 3, is a side elevation of the device, the dotted lines indicatng the movement of the visor relatve to its pivotal point.

Attention is called to the fact that there are but two pieces of strap or sheet metal comprising the main construction of the attaching and manipulating devices of the inventon, which decreases in a very eminent degree the cost of manufacture, and it may also be noted that the general structure of said attaching and manipulating devices is so formed and arranged as to produce a marked degree of strength in the general construction embodied in the invention.

Similar numerals of reference indicate corresponding parts in the figures of the drawings.

The improved automobile visor embodies the attaching device and manipulating device which are generally designated by the numerals 10 and 11 respectively, and which may be stamped or otherwise suitably made from sheet brass or any other suitable material, it being understood that said invention during or after the process of making, may be subject to any suitable tempering or finishing process, applied in any suitable manner consistent with the advantageous use and appearance of said invention.

The attaching device 10 of the visor is formed in a substantially L shape, one portion thereof being formed in a substantially inverted triangle shaped foot 12 having a plurality of through holes 13 therein, said through holes 13 adapted to receive the wood screws 13<sup>A</sup> or other suitable means for attaching said attaching device 10 in a suitable place for use, and another portion thereof being twisted so that its outer extremity is at an angle of ninety degrees, or at right angles relative to the main portion of the same, said outer extremity formed into a substantially round shaped disc or head 14 having a through hole 15 centrally therein, the opposite faces 16 of said disc or head 14 adapted to rotatably engage the oppositely disposed inner faces 17 of a pair of oppositely disposed friction washers or rings 18, having through holes 19 centrally therein, the oppositely disposed outer faces 20 of said friction washers or rings 18 adapted to rotatably engage the oppositely disposed inner faces 21 of the diametrally disposed substantially round shaped discs or heads 22 having through holes 23 and forming the extremities of and integral with the corresponding oppositely disposed members of the yoke 24 thus formed in integral assembly at its central base portion 25 by means of the nut and bolt 26 secured centrally therethrough, said disc or head 14, friction washers or rings 18, and discs or heads 22 operating on a single pivotal point formed by the thumb nut and bolt 22<sup>A</sup>, said central base portion 25 being twisted adjacent to said nut and bolt 26 so that the parallel arms 27 integral therewith are at an angle of ninety degrees, or at right angles relative to said central base portion 25, said parallel arms 27 extending on the opposite faces and central portion of the advertising device 28 and the visor 29, forming at the lower edge of said visor 29 the controlling handle 30, said advertising device 28 being held in position between said parallel arms 27 by means of the rivet 31 adjacent to the central base portion 25, said visor 29 being held in position between said parallel arms 27 by means of the rivets 32 and 33 adjacent to the upper and lower edges of said visor 29.

Once the controlling handle is moved to a position desired by the driver, the visor will remain permanently in such position until again moved by the hand of the driver. In view of the simplicity of the various details of the invention and from the foregoing description it is thought that the advantages in construction and operation of the device will be readily understood by those skilled in the art and further description thereof is deemed unnecessary.

Having thus described my invention, what I claim and desire to secure by Letters Patent is:

1. An automobile visor of the character described comprising a substantially L-shaped bracket fixedly mounted on a windshield frame and having an arm extending rearwardly from said wind shield, a visor carrier hingedly mounted on the end of said arm; said carrier consisting of a pair of parallel bars terminating at their front ends in an integral yoke straddling the end of said bracket arm and at their rear ends in a handle for adjusting said carrier, a visor secured to said carrier, a friction washer interposed between each face of said bracket arm and the opposite wall of said yoke, a headed hinge bolt inserted through said yoke, washers and bracket arm, and a clamping nut screw threaded on one end of said bolt to clamp said carrier in angularly adjusted position with respect to said bracket arm.

2. An automobile visor of the character described comprising a substantially L-shaped bracket having an enlarged vertically disposed foot for attachment to a windshield frame and a horizontal rearwardly extending arm, a visor unit hingedly mounted on said arm, said unit consisting of a pair of parallel bars, a visor embraced between said bars and riveted thereto, said bars terminating at their front ends in an integral hinge yoke projecting beyond the front edge of said visor and straddling the end of said bracket arm, the other ends of said bars projecting a short distance beyond the rear edge of said visor to form a handle for adjusting said visor, a friction washer interposed between each face of said bracket arm and the opposite wall of said yoke, a headed hinge bolt inserted through said yoke, washers and bracket arm, and a winged clamping nut screw threaded on one end of said bolt to clamp said carrier in angularly adjusted position with respect to said bracket arm.

3. An automobile visor carrier formed from a single flat bar of metal having at each end an enlarged apertured head, said bar being bent along a transverse line at its middle point to form a pair of overlying parallel bars, said bars being slightly spaced apart throughout the greater portion of their length to receive an automobile visor therebetween, said bars at one end being compressed together along a small portion of their length to provide a handle for said carrier, said bars being twisted a quarter turn near their other ends and the enlarged apertured ends spread apart to form a hinge yoke having parallel walls disposed at a right angle to the planes of said parallel bars.

In testimony whereof I have hereto affixed my signature.

H. E. WEST.